No. 631,072. Patented Aug. 15, 1899.
J. GROSSÉ.
PROCESS OF SUGAR BOILING.
(Application filed Oct. 23, 1896.)
(No Model.)
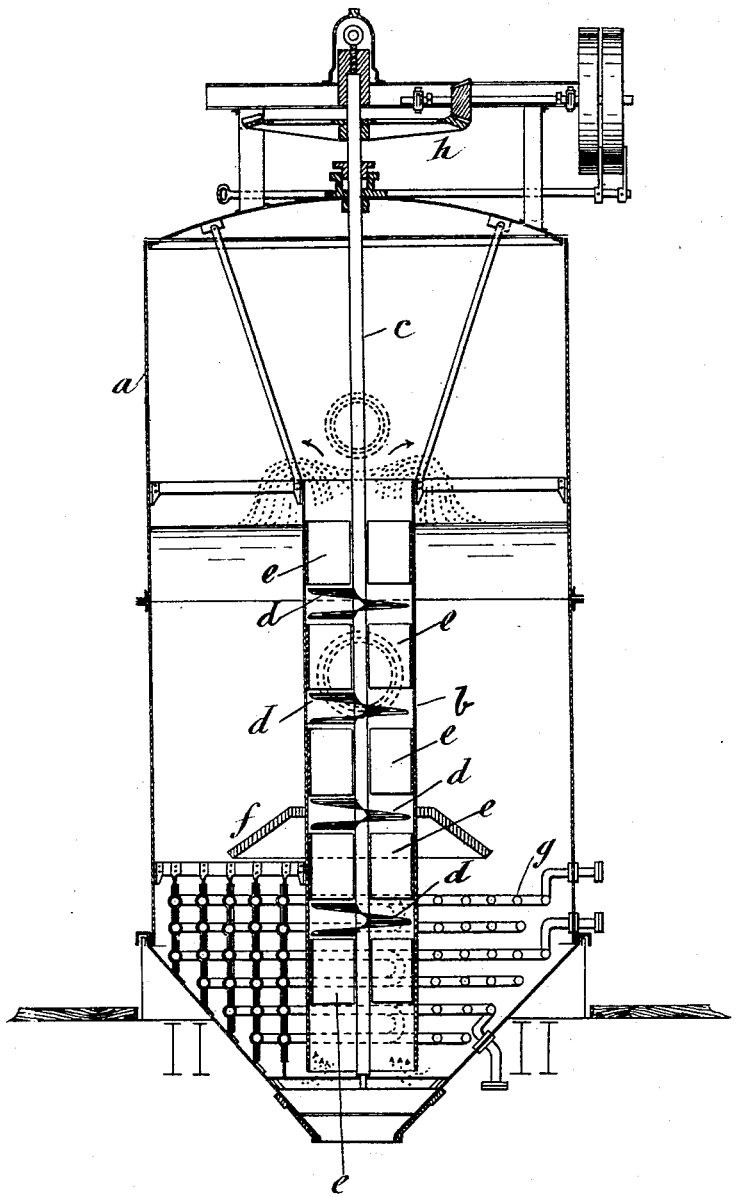
WITNESSES:
INVENTOR
Jan Grossé
BY
ATTORNEYS.

UNITED STATES PATENT OFFICE.

JAN GROSSÉ, OF KIEW, RUSSIA.

PROCESS OF SUGAR-BOILING.

SPECIFICATION forming part of Letters Patent No. 631,072, dated August 15, 1899.

Application filed October 23, 1896. Serial No. 609,847. (No specimens.)

*To all whom it may concern:*

Be it known that I, JAN GROSSÉ, a subject of the Czar of Russia, residing at Kiew, in the Empire of Russia, have invented certain new and useful Improvements in Processes of Crystallizing Impure and Difficultly-Crystallizable Liquors, of which the following is a specification.

In crystallizing impure solutions, and especially the after-products in the manufacture of beet-sugar, it requires even by the most approved and complete processes from four to fourteen days, according to the quality of the liquor to be crystallized.

The object of this invention is to accelerate the crystallization of impure or difficultly-crystallizing liquors, and this acceleration or shortening of time is intended to be produced by subjecting the liquor to be crystallized in the lower strata of its mass to the action of heat in a vacuum or partial vacuum while simultaneously agitating the liquor from the lower layers toward the upper layers, so that the individual particles of the liquor are subjected to continuous evaporation and frequent changes of temperature.

The crystallization of a crystallizable solution is dependent on its density and temperature. When a crystallizable solution which is saturated at a certain temperature is cooled off, crystallization takes place immediately. As, however, during the formation of the crystals and the increasing quantity of the same water is liberated which would render the remaining portion of the solution less concentrated, this water has to be continuously evaporated with the progress of the crystallization, so that the remaining crystallizable liquor remains in a saturated condition, which can be readily accomplished when the liquor is simultaneously agitated by mechanical means and heated up in its lower layers as required. As, furthermore, in a concentrated solution which is heated in a vacuum or a partial vacuum up to the boiling temperature the lower layers are subjected by the pressure of the liquid column above the same to a higher temperature than in the upper layers, therefore it is obvious that a considerable acceleration of the crystallization will take place when the individual particles of the saturated liquor that is heated near the bottom of the vacuum-pan or other crystallization vessel are set into motion from the lower hotter layers into the upper cooler layers, as thereby a simultaneous evaporation and cooling off takes place. These features form the underlying principle of my improved process. For carrying it into practice any shape of crystallization vessels can be used, provided that they have the usual accessories of an ordinary vacuum apparatus, can be hermetically closed, are arranged with a mechanical agitator, and in their lower parts are provided with means for heating the liquor by steam, hot air, hot gases, &c., either by a double jacket, heating-coils, or other devices. An example of such an apparatus is shown in the accompanying drawing, which represents a vertical central section thereof.

In the drawing, $a$ indicates the casing, $b$ an axial cylindrical tube therein supported in any suitable manner, and $c$ indicates the vertical shaft, suitably journaled in the casing and extending axially through the tube $b$, said shaft being provided at suitable intervals with spiral blades $d$. Projecting inwardly from the tube $b$ and arranged at suitable intervals apart, so as to alternate with the spiral blades $d$, are upright wings or vanes $e$, the purpose of which is to prevent the turning of the mass in the tube. $f$ is the distributing-cone, arranged upon the tube $b$ over the heating-coils $g$, and $h$ is a suitable driving-gear for turning the shaft $c$.

In treating, for instance, the after-products in the manufacture of beet-sugar by my improved process, so as to produce the complete crystallization of the same, the following process is carried out: The crystallization vessel is first evacuated and then partly charged with the thickened mass which is to be crystallized. This mass is then raised to the required boiling temperature, corresponding to the pressure on the same, while simultaneously the mechanical agitator is set in motion. With the continued agitation of the mass the gradual heating and evaporation of the same take place, and as soon as the solution in its lower layers arrives at a degree of saturation which corresponds to the temperature in said layers then the crystallization commences immediately in consequence of the movement of the individual particles of the mass by means of the agitator from the lower hotter and the upper cooler layers. In the beginning of the operation finer crystals are deposited, and the concentrating of the mass is continued in this manner until a sufficient quantity of the fine crystals are obtained.

When it is desired to obtain finer or coarser crystals, the further portions of the crystallizable after-products which are charged into the vacuum-pan have to be either in larger or smaller quantities and in more or less concentrated cooler or warmer condition, while the water contained in the mass has to be continuously evaporated by heating the lower layers under continuous mechanical agitation of their particles in direction from the lower layers to the upper layers of the mass, so that the required crystallization and respectively an increase in the size of the crystals are produced. When in this manner by the gradual charging and thickening of the after-products the apparatus is filled to about seven-eighths of its contents, then the heating of the lower layers is discontinued, but the agitation of the mass continued *in vacuo* until the required cooling off and the final dropping of the crystals take place. When the crystallization of all the after-products as obtained in the manufacture of beet-root or other sugars is to be carried on continuously, then the number and size of the vessels of crystallization have to be proportioned to the quantity of the mass that is to be crystallized.

Having thus described my invention, I claim as new and desire to secure by Letters Patent—

The process herein described of crystallizing impure or difficultly-crystallizable liquors, and more especially the after-products of the manufacture of beet-sugar, which consists in heating the mass in vacuum so that the lower layers are at a higher temperature than the upper layers, and continuously lifting the lower hotter layers of the mass in upward direction and discharging them bodily into the upper cooler layers so as to induce by the intermingling of the hotter lower with the upper cooler layers the throwing off and depositing of the crystals from the former, substantially as set forth.

In testimony that I claim the foregoing as my invention I have signed my name in presence of two subscribing witnesses.

JAN GROSSÉ.

Witnesses:
ERNST VON NIESSEN,
KURT VON NIESSEN.